Aug. 27, 1935.  H. N. SMITH  2,012,833
MACHINE FOR MAKING FRICTION ELEMENTS
Filed Nov. 10, 1932   3 Sheets-Sheet 3
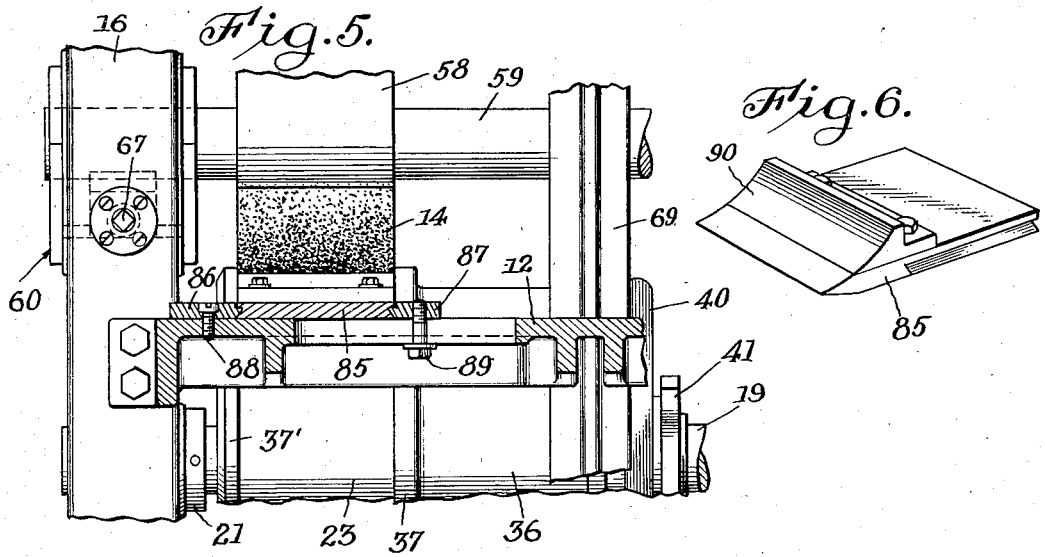
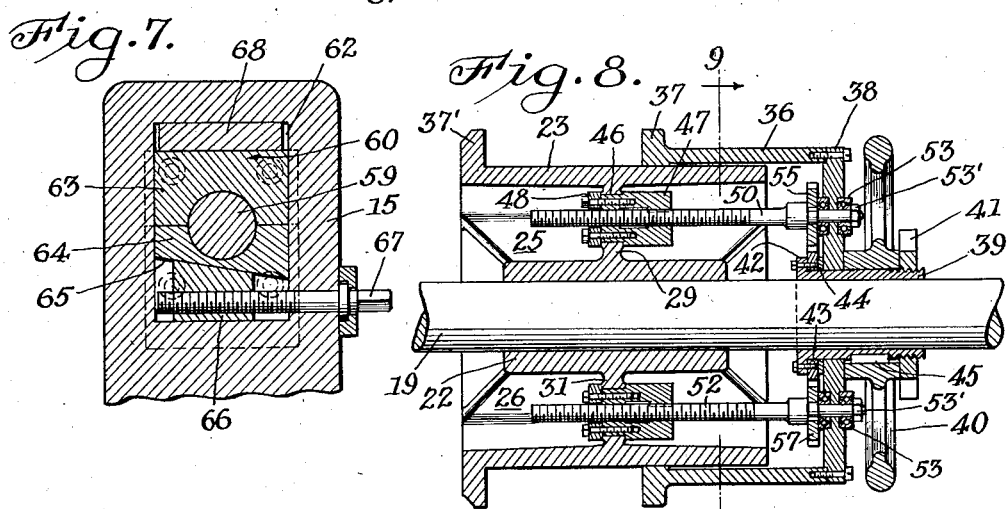
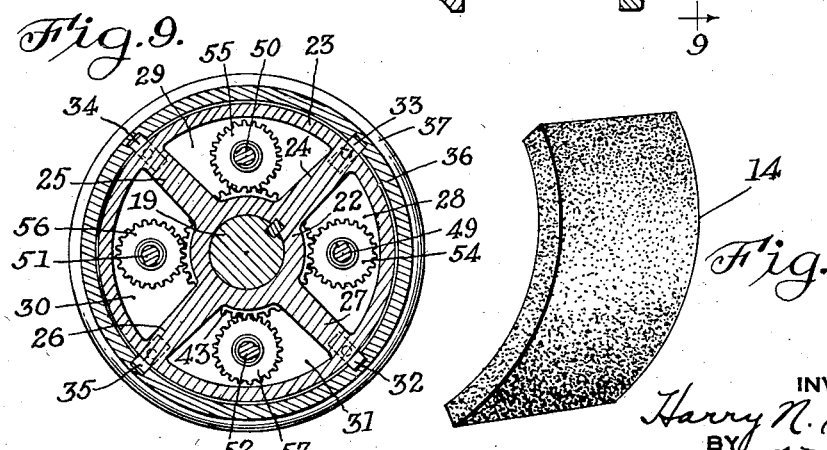

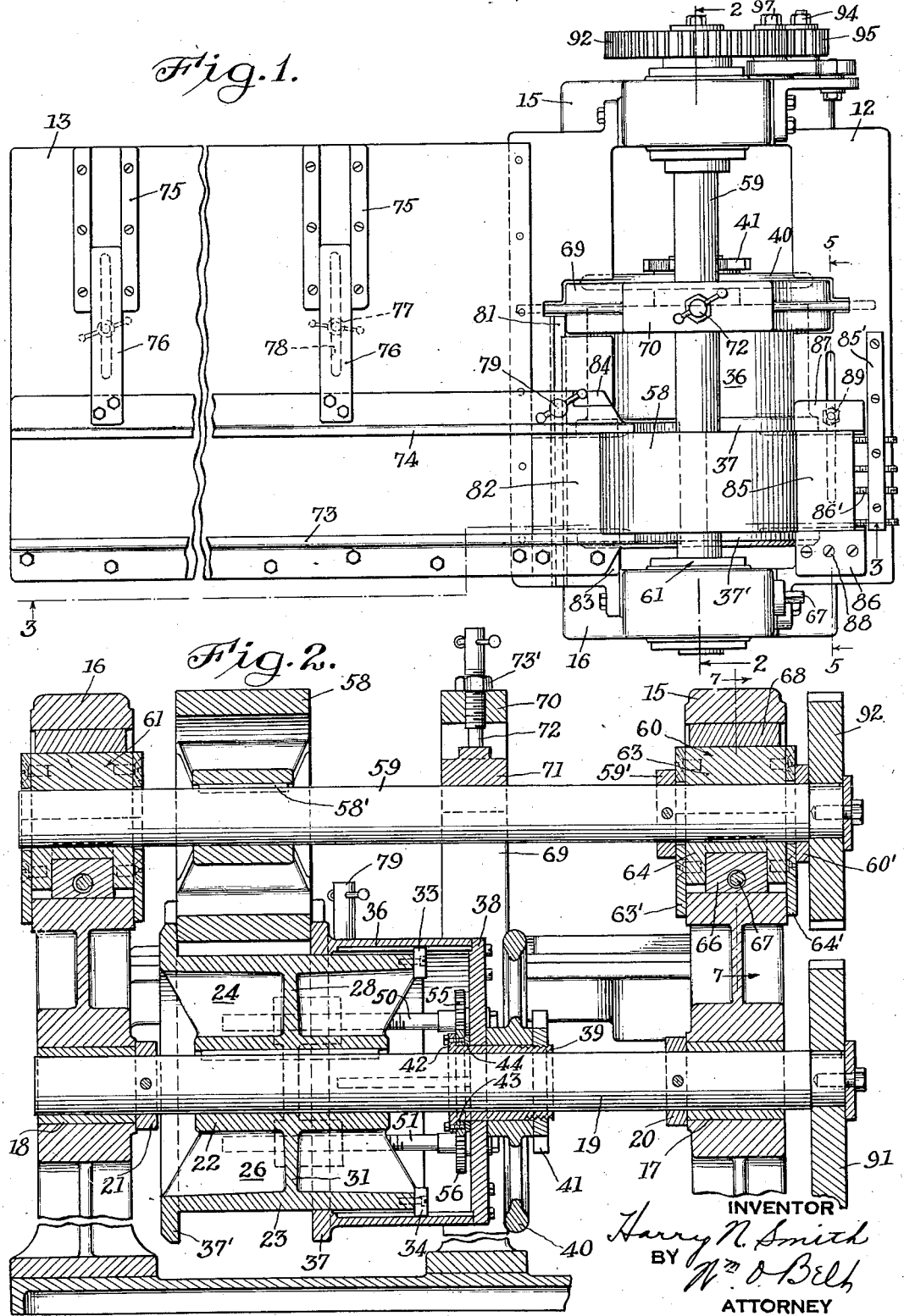

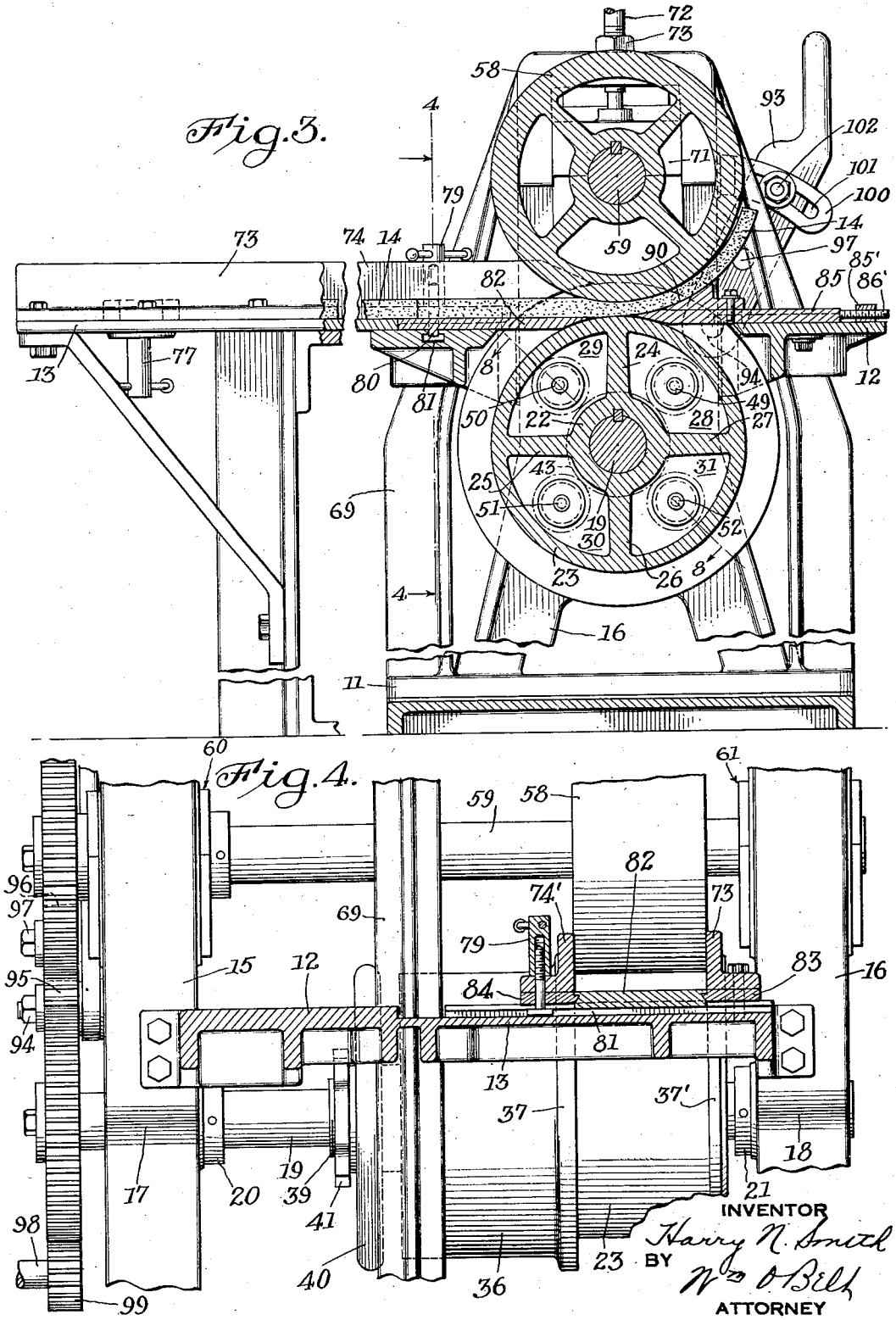

Patented Aug. 27, 1935

2,012,833

UNITED STATES PATENT OFFICE 2,012,833

MACHINE FOR MAKING FRICTION ELEMENTS

Harry N. Smith, Detroit, Mich., assignor to American Brakeblok Corporation, New York, N. Y., a corporation of New York Application November 10, 1932, Serial No. 641,951

17 Claims. (Cl. 18—9)

This invention relates to a machine adapted for use in the manufacture of friction elements or the like.

Friction elements are sometimes made by passing composition friction material between a pair of forming rolls which compact the material and unite it with a reenforcing back fed to the rolls simultaneously with the material. The time the material is subjected to compression is limited since the area of contact with the rolls is necessarily restricted and the material sometimes tends to swell after passing between the rolls with the result that the density of the element is less than desired and the thickness of the element is greater than intended. This tendency to swell increases substantially in direct proportion to the thickness of the element. One of the important objects of this invention is to prolong the time the material is subjected to compression to avoid the tendency of the material to swell after passing through the bight of the rolls.

The friction elements produced by passing composition friction material and a reenforcing back between forming rolls are flat. Such elements, however, are used with arcuate surfaces as, for example, cylindrical brake drums, and to insure uniform and substantial contact it is necessary that the elements be curved correspondingly to the surfaces with which they are to be used. Thin elements can be so curved either with the reenforcing back on the inside or on the outside of the curve without detrimentally affecting the friction surface of the element, which is opposite the back but when thick elements are curved, particularly with the back on the inside of the curve, there is a tendency to crack or otherwise damage the friction surface of the element. Another important object of my invention is to curve friction elements without detriment to the friction surfaces thereof and particularly relatively thick friction elements. An ancillary object is to iron or similarly treat the friction surfaces of the elements to enhance the friction, wear-resisting, and other similar properties thereof.

Further objects are to provide a novel machine wherein composition friction material may be compacted and united with the reenforcing back or wherein previously formed friction elements may be compressed and also curved as required; wherein the friction elements may be operated on without forming fins on the edges or otherwise impairing their serviceability; wherein the machine parts may be expeditiously adjusted to accommodate elements of various sizes; wherein the machine parts are effectively reenforced to prevent distortion; and which will be simple and economical in construction and efficient and positive in operation.

A selected embodiment of the invention is illustrated in the accompanying drawings wherein Fig. 1 is a top plan view;

Fig. 2 is a fragmentary transverse sectional view taken substantially on the line 2—2 on Fig. 1;

Fig. 3 is a vertical sectional view taken substantially on the line 3—3 on Fig. 1;

Fig. 4 is a fragmentary transverse sectional view taken substantially on the line 4—4 on Fig. 3;

Fig. 5 is an end view taken substantially on the line 5—5 on Fig. 1;

Fig. 6 is a perspective detail view of a forming shoe;

Fig. 7 is a view taken substantially on the line 7—7 on Fig. 2;

Fig. 8 is a view taken substantially on the line 8—8 on Fig. 3;

Fig. 9 is a view taken substantially on the line 9—9 on Fig. 8; and

Fig. 10 is a perspective detail view of a typical friction element compacted and curved in the machine.

In the preferred form of invention illustrated in the accompanying drawings I show a machine adapted to compress and curve friction elements made in another machine as, for example, the kind shown in either of my co-pending applications Serial No. 402,100 filed October 24, 1929, now Patent No. 1,907,600, patented May 9, 1933, or Serial No. 491,375, filed October 27, 1930, now Patent No. 1,920,023, patented July 5, 1933. However, it is to be understood that composition friction material might be united with a reenforcing back in the machine to thereby produce the friction element in this machine without departing from the purview of my invention.

The machine has a frame 11 including a table 12 which is preferably elongated, as indicated at 13, so that a plurality of friction elements 14 can be arranged thereon one behind the other to be successively fed to the operating rolls in the machine. The frame includes side frame members 15 and 16 having bearings 17 and 18 therein in which a shaft 19 is journaled. This shaft is held against endwise displacement by collars 20 and 21 pinned or otherwise fastened to the shaft and respectively located to engage the inner ends of the bearings 17 and 18. A hub 22 is keyed to the shaft 19 in juxtaposition to the bearing 18. A drum 23 is disposed about the hub 22 and is connected thereto by four spokes 24, 25, 26 and 27. A web 28 is positioned medially in the extent of the hub 22 between said hub, the drum 23, and the spokes 24 and 27. A web 29 is similarly located between the spokes 24 and 25 and a web 30 is similarly located between the spokes 25 and 26 while a web 31 is similarly located between the spokes 26 and 27.

Blocks 32, 33, 34, and 35 are mounted at the end of the drum 23 adjacent the bearing 17. A sleeve 36 is provided which has spaced keyways in the inner surface thereof to receive the blocks 32 to 35, inclusive. A peripheral flange 37 is provided at the inner end of the sleeve 36 and a peripheral flange 37' is provided on the drum 23 at the end thereof juxtaposed to the bearing 18, and these flanges are adapted to engage the side edges of friction elements moving over the drum 23. Inasmuch as friction elements of different widths are to be operated on in the machine, I arrange the sleeve to be adjustable relative to the flange 37' whereby the space between the flanges 37 and 37' may be varied. The engagement of the blocks 32 to 35, inclusive, in the keyways in the inner surface of the sleeve 36 connects this sleeve to the drum for rotative movement therewith and axial movement thereof.

A plate 38 is secured to the end of the sleeve 36 opposite the flange 37 and this plate has an axial opening therein through which a sleeve 39 embracing the shaft 19 is extended. A hand wheel 40 is slidably keyed on the sleeve 39 outwardly of the plate 38 and a hand nut 41 is screw-threadedly mounted on the sleeve outwardly of the hand wheel. A peripheral flange 42 is provided at the inner end of the sleeve 39 and a gear 43 is secured to this flange and is disposed about the sleeve, a washer 44 being interposed between the gear 43 and the plate 38. When the hand nut 41 is run inwardly the hand wheel 40 is forced toward the plate 38 in one direction and the peripheral flange 42, gear 43, and washer 44 are drawn toward the plate in the opposite direction and these parts are therefore clamped together to prevent relative movement therebetween. The hand wheel 40 is keyed to the sleeve 39 by the key 45 and when the hand nut 41 is loosened and the hand wheel 40 is rotated, the sleeve 39 and therefore the gear 43 rotate relative to the plate 38.

Openings such as 46 are provided in the webs 28 to 31, inclusive, midway between each pair of spokes and substantially midway between the hub 22 and drum 23. Bearing blocks such as 47 extend into the openings 46 and are held against displacement by retainer plates such as 48 bolted or otherwise fastened to the bearing blocks 47. The bearing blocks 47 have screw-threaded axial bores through which the threaded portions of the shafts 49, 50, 51, and 52 are fitted and the other ends of these shafts are journaled in anti-friction bearings such as 53 mounted in the plate 38. A gear 55 is fast on the shaft 50 adjacent the bearing 53 therefor and this gear meshes with the gear 43 and gears 54, 56, and 57 are similarly and respectively arranged on the shafts 49, 51, and 52. Nuts, such as 53', on the ends of the shafts 49 to 52, inclusive, cooperate with the gears on these shafts so that one race of each of the anti-friction bearings is clamped between the gear and the nut on the shaft journaled in the bearing and in this way the plate 38 and the sleeve 36 are connected to shafts for axial movement therewith. Hence, when the sleeve 39 and therefore the gear 43 are rotated, the gears 54 to 57 are also rotated as well as the shafts 49 to 52. The screw-threaded connection between these shafts and the bearing blocks 47 provides what is in effect a nut and bolt arrangement and therefore the shafts 49 to 52, inclusive, tend to move endwise relative to the bearing blocks 47, which are carried by the drum 23, whereupon the sleeve 36 and the flange 37 are moved axially over the drum 23 relative to the flange 37'.

The drum 23 and the flanges 37 and 37' constitute the lower operating roll which is adapted to cooperate with the upper operating roll 58 keyed to the shaft 59. The width of the upper roll 58 corresponds to the width of the friction elements to be operated on in the machine and in operation of the machine the edges of the roll 58 neatly fit between the flanges 37 and 37', as illustrated in Fig. 2, the space between the peripheries of the drum 23 and the roll 58 determining the thickness of the friction element. It is essential that the edges of the drum 58 neatly fit between the flanges to eliminate the formation of fins or the like on the edges of the friction elements. Hence, each time a different width friction element is to be operated on in the machine the upper roll 58 is changed so that it will be of a width corresponding to the width of the element and the flange 37 is adjusted relative to the flange 37'. When it is desired to replace installed roll 58 with one corresponding to the width of a friction element different in width from that on which the machine has been operating, the collar 59' is loosened and the shaft 59 is slid to the right, as viewed in Fig. 2, whereupon the roll 59 may be detached from the key 58' and be removed from the shaft. Then the new roll is secured in position by the key 58' and the end of the shaft 59 is reinserted into the bearing 61 whereupon the collar 59' is again secured to the shaft, and this collar in cooperation with the washer 60' and the gear at the end of the shaft, which will be described more fully hereinafter, holds the shaft 59 against endwise movement in the bearings 60 and 61. The shaft 59 carrying the upper roll 58 is journaled in adjustable bearings, mounted in the side frame members 15 and 16, and generally indicated by 60 and 61. The adjustable bearing 60 is illustrated in detail in Fig. 7 and the adjustable bearing 61 is identical therewith. An opening 62 is provided adjacent the upper end of the side frame member 15 and the adjustable bearing 60 is mounted in this opening. This adjustable bearing includes upper and lower bearing blocks 63 and 64 having cooperating recesses in the abutting faces thereof embracing the shaft 59. Plates 63' and 64' (Fig. 2) are secured to the blocks 63 and 64 at opposite ends thereof and engage the sides of the side frame member 15 and prevent displacement of the blocks from the opening 62 but afford sliding movement of the blocks through the opening. The lower face of the bearing block 64 is tapered as indicated at 65 and a block 66 having a tapered upper surface engages this tapered surface 65. An adjusting bolt 67 is mounted in the side frame member 15 and extends through a threaded bore in the block 66. By rotating the adjusting bolt 67, the block 66 may be moved along the tapered surface 65 and therefore the bearing blocks 63 and 64 may be adjusted vertically in the opening 62 which causes the shaft 59 to move relative to the shaft 19. A gauge block 68 is provided in the upper end of the opening 62 and engages the block 63 to force this block and the block 64 toward the tapered block 66 to thereby tightly secure the blocks in the opening. The thickness of the gauge block 68 corresponds to the desired thickness of the friction element. Hence, to determine the space between the periphery of the drum 23 and the roll 58, a gauge block of predetermined size is selected and inserted in position and then the adjustable block 66 is moved along the tapered surface 65 to wedge the blocks in the opening. Since such adjustable arrangements are provided in the journals for the shaft 59, it is apparent that accurate spacing of the roll 58 from the drum 23 is possible.

As has been stated, the width of the roll 58 corresponds to the width of the friction elements to be operated on in the machine and usually the width of this material is substantially less than the length of the drum 23 and therefore the roll 58. Consequently a material portion of the shaft 59 is unsupported. In operation, considerable force is exerted by the roll 58 and the drum 23 and to prevent the thrust warping or otherwise distorting the shaft 59, I provide a brace consisting of the bracket 69 which extends upwardly from the table 12 and embodies a horizontal part 70 that is disposed above the shaft 59. A block 71 is connected to an adjusting bolt 72 screw-threadedly mounted in the part 70 and by manipulation of the bolt 72 the proper position of the block 71 to prevent warping of the shaft 59 is determined and then the lock nut 73' is tightened to hold the bolt 72 in position.

On the top of the table 12 and particularly on the elongated part 13 thereof and adjacent the forward edge, I secure a flanged guide rail 73. The forward end of this rail engages one edge of the roll 58, said roll being positioned on the shaft 59 to insure the engagement of the edge of the roll with this rail. Inasmuch as friction elements of different width are to be operated on in the machine I provide an adjustable flanged guide rail 74 adapted for cooperation with the guide rail 73 to provide a guideway through which the friction elements may pass to the operating rolls. Two pairs of guide strips 75 are secured on the top of the elongated part 13 of the table, and bars 76 connected to the guide rail 74 are extended between the strips of the pairs of guide strips 75 and have thumb screws 77 secured thereto, said thumb screws projecting through slots 78 in the part 13 and, when tightened, engage the bottom of said part to clamp the bars in place. By loosening the thumb screws 77, the bars 76 may be moved between the guide strips 75 whereupon the guide rail 74 may be adjusted relative to the guide rail 73 so that the spacing between these rails will correspond to the width of the friction elements to be operated on in the machine. The guide rail 74 engages the edge of the roll 58 opposite that engaged by the rail 73 and this end of the guide rail is held in position by a thumb screw 79 including a head 80 mounted in the slot 81 in the table 12. In order to effectively guide the friction elements to the operating rolls I provide a plate 82 at the forward end of the guideway between the guide rails 73 and 74. The underside at the forward end of the guide plate 82 is curved to neatly fit the periphery of the drum 23 and, as best illustrated in Fig. 4, the plate 82 corresponds to the width of the roll 58. This plate 82 is connected by a dovetail key and slot to a strip 83, secured in position by the guide rail 73. The opposite edge of the plate 82 is similarly connected to a block 84 held in position by the guide strip 74 and the thumb screw 79 which passes through the block. At the time the roll 58 is changed, the plate 82 is likewise changed, the block 84 being adjusted to receive the new plate. In this way accurate guiding and full support of the friction elements passing to the operating rolls is assured.

Where the friction elements are formed previously to being passed into this machine they may be made slightly thicker than the intended size and therefore as these elements pass between the operating rolls they are additionally compressed which increases the density thereof and improves the friction, wear-resisting, and other characteristics and this also sizes the elements. Furthermore, the friction elements are usually flat but since they are to be used in connection with arcuate surfaces means are provided in this machine to curve the friction elements to correspond to the arcuate surface with which they are to be used. This same means cooperates with the operating rolls to prevent swelling of the elements after passage thereof between the rolls where they are compressed, and it also irons the elements to improve the friction surface. The means referred to consists of a forming shoe 85 illustrated in detail in Fig. 6. This forming shoe includes dovetail side walls adapted to engage the edges of plates 86 and 87, the plate 86 being secured to the table 12 by the machine screws 88 or the like while the strip 87 is secured in position by the adjusting bolts 89. Like the plate 82, the shoe 85 corresponds to the width of the roll 58 and is changed each time a different width friction element is to be operated on in the machine. The underside of the shoe 85 at the forward edge thereof is shaped to neatly fit the periphery of the drum 23. The upper surface of the shoe at the forward end thereof is arcuate and elongated, as indicated at 90, and provides the forming surface. Subsequent to passage of the friction elements between the operating rolls they move into engagement with the forming surface 90. This surface 90 embodies an arc similar to that of the part with which the element is to be used and the surface 90 is spaced from the periphery of the roll 58 in such a way as to elongate the contact between the roll and the element 14 so that compression pressure is exerted on the element for a much longer time than the mere passage of the element between the rolls. Since the surface 90 is similar to the surface with which the element is to be used and as the element is forcibly pressed onto this surface, the element is shaped to correspond to the surface with which it is to be used, such a shaped element being illustrated in detail in Fig. 10. The surface 90 has the effect of ironing the face of the friction element engaged therewith which tends to increase the density of this face and improve its operating qualities. The surface 90 is disposed on the outside of the curve to be imparted to the element 14 but due to the compression and ironing effect of this surface cracking or other injury to the element and particularly the operating surface thereof is prevented. To insure accurate alignment of the surface 90 with the periphery of the roll 58 and to provide an expeditious adjustment to determine the thickness of the material, I mount a strip 85' on the upper surface of the table 12 and provide a plurality of adjusting screws 86' in this strip. These adjusting screws 86' engage the rear end of the shoe 85 at spaced intervals and by tightening or loosening these screws the relative position of the shoe 85, and therefore the surface 90, to the periphery of the roll 58 is accurately determined.

The drum 23 and the roll 58 are of substantially the same diameter and are adapted to operate synchronically. To this end similarly sized gears 91 and 92 are respectively secured at corresponding ends of the shafts 19 and 59. An arm 93 is mounted on a pin 94 in the table 12 and a pinion 95 is also mounted on this pin. The pinion 95 meshes with the gear 91 and with a pinion 96 mounted on the shaft 97 fast in the arm 93. A pinion 96 meshes with the gear 92. The pinions 95 and 96 are of the same size and therefore since the gears 91 and 92 are of the same size, it is manifest that when the power is supplied through the power input shaft 98 (Fig. 4) to the pinion 99 mounted thereon and meshed with the gear 91, the shafts 19 and 59 and therefore the roll 58 and drum 23 operate synchronically. Inasmuch as the shaft 59 is adapted to be adjusted relative to the shaft 19, I provide an adjustment whereby the arm 93 may be so moved that the meshing between the pinion 96 and the gear 92 will not be affected. This adjustment for the arm 93 includes an arm 100 having a slot 101 therein through which the bolt 102 fast in the arm 93 is extended, a nut on the bolt 102 tightly clamping the arm 93 to the arm 100.

If the machine is to be used to make friction elements as well as to curve and compress the same, suitable composition material is forced between the operating rolls and a reenforcing back is passed to the rolls simultaneously with this material in a position to engage the roll 58. As the material and back pass between the rolls, the material is compacted and united with the back to provide a friction element which is curved during passage thereof over the surface 90.

In this machine the period during which elements are subjected to pressure is prolonged and therefore the tendency to swell is materially mitigated. Moreover, the elements are curved to conform to the shape of the parts with which they are to be used and this is performed without damage to the elements particularly without cracking or otherwise injuring the friction surface, especially in relatively thick elements. The machine parts may be expeditiously adjusted to accommodate friction elements of variable sizes and the parts are effectively reenforced to prevent warping or distortion during operation of the machine. While the machine is particularly adapted for use with friction elements made in another machine it is equally adaptable for use in the making of friction elements. Furthermore, I have set forth a preferred form of construction and operation but I do not wish to be limited to the precise details set forth but desire to avail myself of such variations and modifications as fall within the spirit and scope of the following claims:

I claim:

1. In a machine adapted for use in the manufacture of friction elements and the like, a pair of operating rolls mounted for engagement with friction elements passed therebetween, and forming means cooperating with one of the rolls and prolonging the period of roll engagement with the elements.

2. In a machine adapted for use in the manufacture of friction elements and the like, a pair of operating rolls mounted for engagement with friction elements passed therebetween, and forming means cooperating with one of the rolls and prolonging the period of roll engagement with the elements and having the leading edge thereof in juxtaposition to the other of the rolls whereby the elements pass onto the forming means immediately after passing between the rolls.

3. In a machine adapted for use in the manufacture of friction elements and the like, a pair of operating rolls mounted for engagement with friction elements passed therebetween, and means spaced from one of the rolls and including a forming surface formed complementary to said one roll and positioned relative thereto to prolong the period of roll engagement with said elements to impart a curve to the elements passed between said one roll and the forming surface.

4. In a machine adapted for use in the manufacture of friction elements and the like, a pair of operating rolls mounted for engagement with friction elements passed therebetween, a shoe having a forming surface thereon spaced from one of the rolls and formed complementary to said one roll and positioned relative thereto to prolong the period of roll engagement with said elements and adapted to impart a curve to elements passing thereover, and means adjustably securing said shoe in the machine.

5. In a machine adapted for use in the manufacture of friction elements and the like, a pair of operating rolls mounted for engagement with elements passed therebetween, one of said rolls comprising a drum and having flanges between which the other of the rolls is adapted to be fitted, and means associated with said drum for varying the spacing between said flanges.

6. In a machine adapted for use in the manufacture of friction elements and the like, a pair of operating rolls of different widths mounted for engagement with elements passed therebetween, the wider of said rolls comprising a drum having a flange at one end thereof, a sleeve mounted on said drum and having a flange thereon adapted to be spaced from the flange on said drum whereby the edges of the narrower roll may be fitted between said flanges, and means for holding said sleeve against axial movement on said drum to maintain the spacing between said flanges.

7. In a machine adapted for use in the manufacture of friction elements and the like, a pair of operating rolls of different widths mounted for engagement with elements passed therebetween, the wider of said rolls comprising a drum having a flange at one end thereof, a sleeve mounted on said drum and having a flange thereon adapted to be spaced from the flange on said drum whereby the edges of the narrower roll may be fitted between said flanges, means for adjusting said sleeve axially along said drum, and means for holding said sleeve in adjusted positions on said drum.

8. In a machine adapted for use in the manufacture of friction elements and the like, a pair of operating rolls of different widths mounted for engagement with elements passed therebetween, the wider of said rolls comprising a drum having a flange at one end thereof, a sleeve mounted on said drum and having a flange thereon adapted to be spaced from the flange on said drum whereby the edges of the narrower roll may be fitted between said flanges, means connecting said sleeve to said drum for rotation therewith and axial movement thereof, means cooperating with said drum for moving said sleeve axially, and means for locking said sleeve against axial movement.

9. In a machine adapted for use in the manufacture of friction elements and the like, a pair of operating rolls of different widths mounted for engagement with elements passed therebetween, the wider of said rolls comprising a drum having a flange at one end thereof, a sleeve mounted on said drum and having a flange thereon adapted to be spaced from the flange on said drum whereby the edges of the narrower roll may be fitted between said flanges, means connecting said sleeve to said drum for rotation therewith and axial movement thereof, shafts connected to said sleeve for axial movement therewith, means screw-threadedly connecting said shafts to said drum, and means for rotating said shafts to move said sleeve axially of said drum.

10. In a machine adapted for use in the manufacture of friction elements and the like, a pair of operating rolls of different widths mounted for engagement with elements passed therebetween, the wider of said rolls comprising a drum having a flange at one end thereof, a sleeve mounted on said drum and having a flange thereon adapted to be spaced from the flange on said drum whereby the edges of the narrower roll may be fitted between said flanges, means connecting said sleeve to said drum for rotation therewith and axial movement thereof, shafts connected to said sleeve for axial movement therewith, means screw-threadedly connecting said shafts to said drum, means for rotating said shafts to move said sleeve axially of said drum, and means for holding the rotating means against movement to secure said sleeve in adjusted positions on said drum.

11. In a machine adapted for use in the manufacture of friction elements and the like, a pair of operating rolls of different widths and adapted for engagement with elements passed therebetween, the narrower of said rolls corresponding in width to the width of elements being operated upon in the machine, means removably supporting said narrower roll in the machine whereby said roll may be changed upon variation in the width of elements to be operated upon in the machine, the wider of the rolls having a fixed flange thereon and another flange adjustable relative to the fixed flange whereby the narrower roll may be fitted between said flanges, one of the edges of the narrower of said rolls being engaged with the fixed flange on the wider of said rolls when the narrower of said rolls is changed upon variation of the width of elements to be operated upon in the machine to thereby orient the narrower roll in the machine, means on the wider of said rolls for securing the adjustable flange in position thereon and in engagement with the edge of the narrower of the rolls opposite the edge thereof engaging the fixed flange, a pair of guide rails for directing the elements to the rolls for passage therebetween, means fixedly securing one of said rails in the machine in alignment with the fixed flange, and means adjustably securing the other of the rails in the machine in alignment with the adjustable flange.

12. In a machine adapted for use in the manufacture of friction elements and the like, a pair of operating rolls of different widths and adapted for engagement with elements passed therebetween, the wider of said rolls having flanges thereon, the narrower of said rolls corresponding in width to the width of elements being operated on in the machine and being positioned relative to the flanges on the wider roll, means removably supporting said narrower roll whereby it may be changed upon variation in the width of elements to be operated on in the machine, a guide rail fast in the machine and aligned with one edge of said narrower roll and a flange on the wider roll, an adjustable guide rail in the machine adapted to be aligned with the other edge of said narrower roll and cooperating with the other guide rail to provide a guideway for elements passing to the rolls, and adjustable means securing said adjustable guide rail in position and permitting adjustment of the adjustable guide rail when said narrower roll is changed upon variation in the width of elements.

13. In a machine adapted for use in the manufacture of friction elements and the like, a pair of operating rolls of different widths and adapted for engagement with elements passed therebetween, the wider of said rolls having a fixed flange thereon and an adjustable flange, means securing the adjustable flange in adjusted positions relative to the fixed flange, the narrower of said rolls corresponding in width to the width of elements being operated on in the machine and being positioned between the flanges on the wider roll, means removably supporting said narrower roll whereby it may be changed upon variation in the width of the elements to be operated on in the machine, said adjustable flange on said wider roll being adjusted relative to the fixed flange upon a change in the width of the narrower roll, a guide rail fast in the machine and aligned with one edge of the narrower roll and the fixed flange on the wider roll, an adjustable guide rail in the machine adapted to be aligned with the other edge of said narrower roll and with the adjustable flange on said wider roll and cooperating with the fixed guide rail to provide a guideway for elements passing to the rolls, and means securing said adjustable rail in position and permitting adjustment of said adjustable guide rail when said narrower roll is changed and the position of said adjustable flange is altered upon variation in the width of elements being operated on in the machine.

14. In a machine adapted for use in the manufacture of friction elements and the like, a pair of operating rolls adapted for engagement with elements passed therebetween, one of said rolls corresponding in width to the width of elements being operated upon in the machine, means removably supporting said one roll whereby it may be changed upon variation in the width of elements to be operated upon in the machine, a plate over which the elements pass during movement thereof to the rolls, said plate guiding the elements to the rolls and including a portion formed complementary to the periphery of one of said rolls, said plate also corresponding in width to the width of elements being operated upon in the machine, means in the machine supporting said plate and including a fixed member and a member adjustable relative thereto, said fixed and adjustable members and said plate including interfitting dovetail portions extending in the direction of movement of said elements to said rolls and providing a rigid support for said plate, and means for securing the adjustable member in position and adapted to be released to permit substitution of a new plate upon a change of the roll corresponding in width to the width of the elements whereby the plate may be changed when there is a variation in width of elements to be operated upon in the machine.

15. In a machine adapted for use in the manufacture of friction elements and the like, a pair of operating rolls adapted for engagement with elements passed therebetween, one of said rolls corresponding in width to the width of elements being operated on in the machine, means removably supporting said one roll whereby it may be changed upon variation in the width of elements to be operated on in the machine, and means corresponding in width to said one roll and having a forming surface thereon cooperating with said one roll to prolong engagement of the elements with said one roll to impart a curve to elements passing thereover.

16. In a machine adapted for use in the manufacture of friction elements and the like, a pair of operating rolls adapted for engagement with elements passed therebetween, one of said rolls corresponding in width to the width of elements being operated on in the machine, means removably supporting said one roll whereby it may be changed upon variation in the width of elements to be operated on in the machine, curving means corresponding in width to said one roll and having a forming surface thereon cooperating with said one roll to impart a curve to elements passing thereover, and means adjustably securing said curving means in position and permitting substitution of a new curving means upon change of said one roll when there is a variation in the width of elements to be operated on in the machine.

17. In a machine adapted for use in the manufacture of friction elements and the like, a pair of operating rolls adapted for engagement with elements passed therebetween, one of said rolls corresponding in width to the width of elements being operated on in the machine, means removably supporting said one roll whereby it may be changed upon variation in the width of elements to be operated on in the machine, a shoe mounted in juxtaposition to said rolls and adapted to be engaged by elements passing from said rolls and including a forming surface spaced from said one roll and cooperating therewith to impart a curve to elements passing thereover, said shoe corresponding in width to the width of elements being operated on in the machine, and adjustable means for detachably securing said shoe in position whereby a new shoe may be installed upon change of said one roll when there is a variation in the width of elements to be operated on in the machine.

HARRY N. SMITH.